(No Model)
R. WOOTTON & B. HEWITT.
F. L. MIDDLETON, Ancillary Administrator of B. HEWITT, Deceased.
MACHINE FOR DRYING TUBES.
No. 585,808. Patented July 6, 1897.
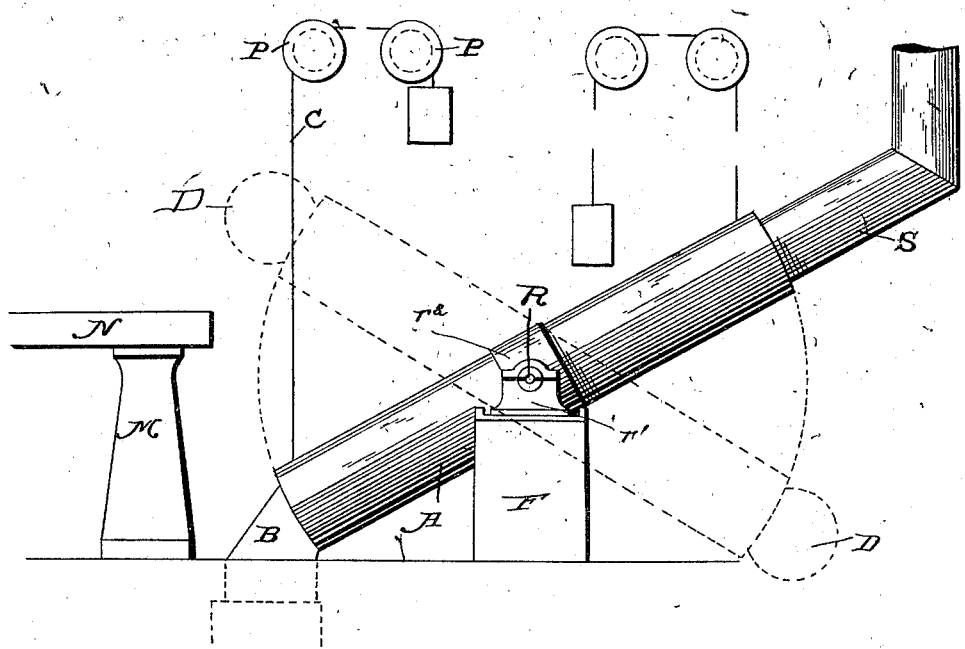
Attest
Walter Donaldson
C. S. Middleton
Inventors
Robert Wootton
B. Hewitt, Dec'd, F. L. Middleton
Anc. Adm'r
by Richards & Co.
Attys
THE NORRIS PETERS CO., PHOTO-LITHO., WASHINGTON, D. C.

United States Patent Office.

ROBERT WOOTTON, OF BIRMINGHAM, ENGLAND, AND FRANK L. MIDDLETON, OF WASHINGTON, DISTRICT OF COLUMBIA, ANCILLARY ADMINISTRATOR OF BENJAMIN HEWITT, DECEASED, ASSIGNORS TO THE BRITISH TUBE COMPANY, LIMITED.

MACHINE FOR DRYING TUBES.

SPECIFICATION forming part of Letters Patent No. 585,808, dated July 6, 1897.

Application filed March 5, 1896. Serial No. 581,999. (No model.) Patented in England July 22, 1895, No. 13,921.

*To all whom it may concern:*

Be it known that ROBERT WOOTTON, a subject of the Queen of Great Britain, and a resident of Birmingham, England, did invent jointly with BENJAMIN HEWITT, deceased, (FRANK L. MIDDLETON, administrator,) certain new and useful Improvements in Machines for Drying Tubes, (for which a patent has been obtained in Great Britain, dated July 22, 1895, No. 13,921,) of which the following is a specification.

The invention has for its object an improved machine for drying tubes, and is for the purpose of receiving the tubes during their process of manufacture or when finished, so that all moisture may be at once dried up and deterioration prevented.

In carrying out the invention a round casing is pivoted at its center on a strong pivot and stand with end doors, so that the tube can be filled at one end and emptied at the other. Such a casing may be a large welded tube without a joint, thus offering no impediment to the entry and withdrawal of the tubes. Stages may be used at each end to feed and discharge the casing as it is worked upon the pivot, or it may be hung over a recess in the floor. Hot air or gas or dry steam is used for the drying of the tubes.

The drawing shows a side elevation of the invention.

The machine has its body part A made from a welded or other tube with end doors D D. This machine is hung upon trunnions R, which are secured to the body by the belt $r^2$, and the whole is supported in the plumber-blocks $r'$ by the pillar F. This machine may be loaded or charged from the platform N when it is in the position shown by dotted lines, which is mounted upon pillars M. When the end is lowered into the position as shown on the drawing, the heat is communicated through B and escapes at S. The discharge is effected through the bottom door D when the machine is in the position shown by dotted lines, but any convenient inclination may be adopted.

Any suitable form of grating may be used at the inlet end of the chamber to hold the material.

What is claimed, then, is—

1. In combination, a drying-chamber pivoted at or near its center and having openings at its opposite ends for the introduction and outlet of the material, the hot-air pipe connecting with the filling-opening at one end of the chamber to discharge hot air through said filling-opening directly into the interior of the chamber to impinge upon the material to be dried and the hot-air-discharge pipe leading from the discharge end of the chamber and communicating with the interior thereof, said pipes being adapted when the chamber is swung in one position to inclose the filling and discharge openings and when swung in another position to let said openings be free, substantially as described.

2. In combination, a chamber pivoted at or near its center and arranged to be swung from side to side to be in inclined position, said chamber having an inlet at one end and an outlet at the other end for the material to be dried a supply-pipe and a discharge-pipe for hot air at opposite ends of the chamber and in different horizontal planes, said discharge-pipe being elevated in relation to the supply-pipe whereby the hot air will rise through the chamber and when reversed the ends of said chamber will be out of line with the supply and discharge pipes for the discharge and the renewal of the material to be treated.

In witness whereof we have hereunto set our hands in the presence of two witnesses.

ROBT. WOOTTON.
FRANK L. MIDDLETON,
*Ancillary administrator of the estate of Benjamin Hewitt.*

Witnesses as to the signature of Robert Wootton:
THOS. MEADOWCROFT,
ALBERT E. OCKFORD.

Witnesses as to the signature of Frank L. Middleton:
JAMES M. SPEAR,
C. S. MIDDLETON.